United States Patent
Bae et al.

(10) Patent No.: US 10,328,381 B2
(45) Date of Patent: Jun. 25, 2019

(54) ACTIVATED CARBON AND METHOD FOR MANUFACTURING THE SAME

(71) Applicants: Hyundai Motor Company, Seoul (KR); INHA-INDUSTRY PARTNERSHIP INSTITUTE, Incheon (KR)

(72) Inventors: Shin Tae Bae, Gyeonggi-do (KR); Young Jung Heo, Chungcheongbuk-do (KR); Soo Jin Park, Seoul (KR)

(73) Assignees: Hyundai Motor Company, Seoul (KR); INHA-Industry Partnership Institute, Incheon (KR)

( * ) Notice: Subject to any disclaimer, the term of this patent is extended or adjusted under 35 U.S.C. 154(b) by 22 days.

(21) Appl. No.: 15/246,943

(22) Filed: Aug. 25, 2016

(65) Prior Publication Data

US 2017/0247258 A1 Aug. 31, 2017

(30) Foreign Application Priority Data

Feb. 25, 2016 (KR) .................. 10-2016-0022772

(51) Int. Cl.
| | | |
|---|---|---|
| *C01B 31/08* | (2006.01) | |
| *B01D 53/04* | (2006.01) | |
| *B01J 20/20* | (2006.01) | |
| *B01J 20/28* | (2006.01) | |
| *B01J 20/30* | (2006.01) | |
| *B01D 53/02* | (2006.01) | |
| *C01B 32/342* | (2017.01) | |
| *B60H 3/06* | (2006.01) | |

(52) U.S. Cl.
CPC ............. *B01D 53/04* (2013.01); *B01D 53/02* (2013.01); *B01J 20/20* (2013.01); *B01J 20/2808* (2013.01); *B01J 20/28016* (2013.01); *B01J 20/28064* (2013.01); *B01J 20/28085* (2013.01); *B01J 20/28092* (2013.01); *B01J 20/3021* (2013.01); *B01J 20/3064* (2013.01); *B01J 20/3078* (2013.01); *C01B 32/342* (2017.08); *B01D 2253/102* (2013.01); *B01D 2253/304* (2013.01); *B01D 2253/306* (2013.01); *B01D 2253/308* (2013.01); *B01D 2253/31* (2013.01); *B01D 2257/504* (2013.01); *B01D 2259/4566* (2013.01); *B60H 2003/0691* (2013.01); *Y02C 10/08* (2013.01); *Y02C 20/10* (2013.01)

(58) Field of Classification Search
CPC ..................................................... C01B 32/342
See application file for complete search history.

(56) References Cited

U.S. PATENT DOCUMENTS 9,040,452 B2 * 5/2015 Kishimoto ............. H01M 4/90
423/231

FOREIGN PATENT DOCUMENTS

| KR | 10-1989-0001298 B1 | 4/1989 |
| KR | 10-2009-0085756 A | 8/2009 |
| KR | 10-1123586 | 3/2012 |
| KR | 10-1588768 B1 | 1/2016 |

OTHER PUBLICATIONS

Zhang, X.L. et al, "Effect of activation agents on the surface chemical properties and desulphurization performance of activated carbon", Science China Technological Sciences, vol. 53, No. 9, (Sep. 2010) pp. 2515-2520.

Wei, H. et al, "Granular Bamboo-Derived Activated Carbon for High CO2 Adsorption: The Dominant Role of Narrow Micropores", ChemSusChem, vol. 5 (2012) pp. 2354-2360.

* cited by examiner

*Primary Examiner* — Stuart L Hendrickson

(74) *Attorney, Agent, or Firm* — Mintz Levin Cohn Ferris Glovsky and Popeo, P.C.; Peter F. Corless

(57) ABSTRACT

Disclosed is an activated carbon including pores formed on a surface thereof, in particular, the pores include ultra-micropores having a diameter that is equal to or less than about 1.0 nm.

15 Claims, 5 Drawing Sheets

ACTIVATED CARBON AND METHOD FOR MANUFACTURING THE SAME

CROSS-REFERENCE TO RELATED APPLICATION

The present application claims priority of Korean Patent Application No. 10-2016-0022772 filed on Feb. 25, 2016, the entire contents of which are incorporated herein for all purposes by this reference.

TECHNICAL FIELD

The present invention relates to activated carbon and a manufacturing method of the same.

BACKGROUND

Recently, interest in environmentally friendly cars has been increasing rapidly due to fossil fuel depletion and the greenhouse gas exhaust. Especially in eco-friendly cars, a travel distance of the electric vehicle has emerged as an important issue.

For heating and cooling, unlike an internal combustion engine, the electric vehicle typically has no waste heat source (engine coolant) for heating and no waste power for compressing a coolant. Accordingly, power for a PTC (positive temperature coefficient) heater and for compressing the coolant may be additionally required, and thus additional power may be consumed. As a result, the travel distance may be reduced by about 30 to 50%.

Accordingly, it is necessary to minimize outdoor air introduction in order to prevent temperature change. In this case, the concentration of carbon dioxide in a vehicle may be increased by carbon dioxide exhausted by passengers, and thus safety problems are generated. For example, 2,000 ppm or greater amount of carbon dioxide may cause drowsiness, and 5,000 ppm of carbon dioxide may cause a lapse into dyspnea.

Accordingly, studies to reduce the carbon dioxide in the vehicle have been conducted. Currently, an air filter (including activated carbon) has been applied to some high-end cars. However, this air filter can serve to remove harmful gasses such as volatile organic compounds (VOC) or fine dust, but it is difficult to remove carbon dioxide.

A conventional activated carbon manufacturing method has been used. For example, various vegetable materials such as coconut husks may be carbonized from precursors through a high temperature heat treatment under a non-activated environment, and temperature chemical or physical activation may be additionally performed thereon to have a large number of pores. However, according to this conventional method, surface pore sizes of the manufactured activated carbon may not be uniform such that a wide distribution range of micropores to macropores can be formed. As a result, pore uniformity may be decreased and forming ultra-micropores of one nanometer or less is difficult.

The foregoing is intended merely to aid in the understanding of the background of the present invention, and is not intended to mean that the present invention falls within the purview of the related art that is already known to those skilled in the art.

SUMMARY

In preferred aspects, the present invention provides activated carbon and a manufacturing method thereof, thereby improving selective adsorptive capacity of carbon dioxide.

In one aspect of the present invention, provided is an activated carbon including pores formed on a surface thereof. The pores may include ultra-micropores having a diameter that is equal to or less than about 1.0 nm.

A volume of the ultra-micropores suitably may be in a range of about 67 volume % to 83 volume % for a total of 100 volume % of the pores of a surface of the activated carbon.

A particle size of the activated carbon suitably may be in a range of about 150 um to 250 um.

A particle size of the activated carbon suitably may be in a range of about 150 um to 250 um.

A BET specific surface area of the activated carbon may be greater than about 672.7 m$^2$/g.

In another aspect, the present invention provides a method of manufacturing an activated carbon. The method may include: preparing a carbon precursor; carbonizing the carbon precursor by heat treating thereon; equalizing the carbonized carbon precursor in size by grinding; and activating the ground carbon precursor by adding an oxidizing agent and distilled water into the carbon precursor and by heat treating, thereby forming an activated carbon.

The term "carbon precursor" as used herein refers to a material that may provide major carbon sources before modification, treatment or activation of carbons. The carbon precursor may be modified, treated or activated such that the obtained carbon material may include carbons as a main component, for example, constituting greater than about 50 wt %, greater than about 60 wt %, greater than about 70 wt %, greater than about 80 wt %, greater than about 90 wt %, greater than about 95 wt %, or greater than about 99 wt % of the total weight thereof. The carbon precursor may include mineral sources such as coal, fossil fuels, chemical sources such as organic compounds, or biological sources such as plants. The term "carbonizing" as used herein refers to a process or reaction converting a material containing carbon components or an organic material into carbon or substantially pure carbon. The carbonizing may be performed by, for example, heating, burning, thermochemical decomposition, catalytic reaction, or the like. Exemplary carbonizing may be heating in an inert gas condition, thereby preventing combustion or oxygenation of carbon materials during carbonization. The oxidizing agent suitably may include $H_2O_2$, $HNO_3$, $O_3$, $N_2O$, $H_2SO_4$, $F_2$, $Cl_2$, or a combination thereof in the activating.

A volume of the oxidizing agent suitably may be in a range of about 10 volume % to 50 volume % for a total of 100 volume % of the oxidizing agent and the distilled water, in the activating.

The activating suitably may be performed at a temperature in a range of about 700° C. to 1000° C.

The activating suitably may be performed while injecting a mixture of the oxidizing agent and the distilled water into the carbon precursor at a speed in a range of about 1 ml/h to 100 ml/h.

The activating suitably may be performed under a pressure in a range of 0 bar to about 5 bar.

The activating suitably may be performed for about 1 h to 5 h.

The manufacturing method may further include reducing a surface of the activated carbon by heat treating under an atmosphere including hydrogen ($H_2$), after the activating. Preferably, the reducing may be performed under an environment in which an inert gas and hydrogen ($H_2$) gas are mixed, and a volume of the hydrogen ($H_2$) gas suitably may be in a range of greater than 0 volume % to about 10 volume % for a total of 100 volume % of the inert gas and hydrogen ($H_2$) gas.

The reducing suitably may be performed at a temperature in a range of about 700° C. to 1000° C.

The reducing suitably may be performed for about 5 hours to 10 hours.

The manufacturing method may further include selecting the ground carbon precursor by using a sieve having a size in a range of suitably 100 um to 250 um, after the grinding.

The grinding may be performed by using a ball mill, and a particle size of a ball used for the ball mill suitably may be in a range of about 1 mm to 20 mm.

A volume of the carbon precursor suitably may be in a range of about 0.1 volume % to 40 volume % for a total of 100 volume % of the carbon precursor and the ball mill, in the equalizing.

A processing speed for the ball mill suitably may be in a range of about 100 rpm to 500 rpm, in the grinding.

A processing time for the ball mill suitably may be in a range of about 30 minutes to 5 h, in the grinding.

The carbonizing suitably may be performed at a temperature in a range of about 700° C. to 1000° C.

In the preparing of the carbon precursor, the carbon precursor may include starch, coconut husks, citrus peels, coffee grounds, bamboo stems, or a combination thereof.

Further provided is a vehicle part that may comprise the activate carbon as described herein. Exemplary vehicle part may be an air filter.

Other aspects of the invention are disclosed infra.

According to the exemplary embodiments of the present invention, an activated carbon and a manufacturing method thereof can be provided which may improve selective adsorptive capacity of carbon dioxide.

DETAILED DESCRIPTION

Figure 1:
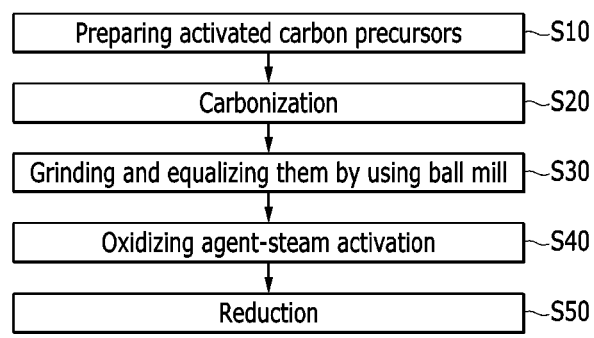
FIG. 1 illustrates an exemplary activated carbon manufacturing method according to according to an exemplary embodiment of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present disclosure will be described. The exemplary embodiments, however, are provided as examples, and the present invention is not limited thereto, but is defined within the range of claims to be described below.

In this specification, the word "ultra-micropore" indicates a pore having a diameter of 1 nm or less. Further, the word "micropore" indicates a pore having a diameter of 2 nm or less. In addition, the word "mesopore" indicates a pore having a diameter that is in a range of more than 2 nm to 50 nm or less.

As described above, surface pore sizes of the conventional activated carbon may vary in a wide distribution range from micropores to macropores. As a result, pore uniformity is decreased and forming ultra-micropores of one nanometer or less is difficult.

Accordingly, the present invention provides an activated carbon and a manufacturing method thereof. As such, the active carbon may obtain substantially improved adsorbing capacity of carbon dioxide by forming increased number of ultra-micropores having a diameter of 1 nm or less.

FIG. 1 illustrates an activated carbon manufacturing method according to an exemplary embodiment of the present invention. Hereinafter, an activated carbon manufacturing method and manufactured activated carbon will be described with reference to FIG. 1.

According to an exemplary embodiment of the present invention, the activated carbon manufacturing method may comprise: preparing a carbon precursor (S10); carbonizing the carbon precursor by heat treatment (S20); equalizing the carbonized carbon precursor by grinding to form in uniform size (S30); and activating the ground carbon precursor by adding an oxidizing agent and distilled water to the carbon precursor and heat treating thereon (S40).

The grinding of the carbon precursor may be performed by using a ball mill. The grinding of the carbon precursor by using the ball mill may facilitate equalizing particles in sizes thereof, thereby manufacturing high-quality activated carbon from which impurities may be removed. Such a grinding operation may be performed by using any method that can execute uniform grinding, such as a milling method in additional to the method using the ball mill.

Further, the carbon precursor may be activated by simultaneously using the oxidizing agent and the distilled water (oxidizing agent-steam activation) to increase the activity of steam molecules. Accordingly, a formation rate of ultra-micropores having a diameter of 1 nm or less may be selectively increased on carbon surfaces. Accordingly, a specific surface area of the activated carbon and pore uniformity may be increased.

Hereinafter, each step of the manufacturing method and the manufactured activated carbon will be described.

In the preparing of the carbon precursor (S10), the carbon precursor may include starch, coconut husks, citrus peel, coffee grounds, bamboo stems, or a combination thereof. However, the present invention is not limited thereto, but any materials based on various vegetables, plants, or other biological materials can be used as the carbon precursor. For example, materials based on the inexpensive plants and vegetables can reduce the manufacture cost of the activated carbon.

The carbonizing of the carbon precursor by using a heat treatment (S20) may be performed in an inert gas atmosphere. The inert gas may include nitrogen or argon, but the present invention is not limited thereto.

A temperature of the heat treatment for the carbonizing may be in a range of about 700° C. to 1000° C. The carbonizing may not be completed at a temperature less than 700° C. Since the carbonization is sufficiently performed in a temperature range of about 700° C. to 1000° C., the heat treatment at a temperature greater than about 1000° C. may not be necessary. When the temperature of heat treatment is greater than about 1000° C., unnecessary costs may be generated, and the carbonization yield may be reduced.

The carbonized carbon precursor may be equalized in sizes by grinding them (S30) using the ball mill, and materials of a ball used for the ball mill and a vessel of the ball mill may include SUS or zirconia ($ZrO_2$), but the present invention is not limited thereto.

A particle size of the ball used for the ball mill may be in a range of about 1 mm to 20 mm. When the size of the ball is less than the predetermined range, for example, less than about 1 mm, the yield may be rapidly reduced, and a relative content of impurities in particles may be increased. In contrast, when the size of the ball is greater than the predetermined size, particles having large sizes may be mainly formed, thereby reducing a ball mill effect.

A volume of the carbon precursor may be in a range of about 0.1 volume % to 40 volume % for a total volume 100 volume % of the ball used for the carbon precursor and the ball mill. Preferably, the volume of the carbon precursor may be in a range of about 0.1 volume % to 30 volume %. When the volume of the precursor is greater than the predetermined range, for example, greater than about 30 volume % of the volume of the ball, the ball mill effect may be deteriorated. In contrast, when the volume of the precursor is less than the predetermined range, less than about 0.1 volume % of the ball, heat generated in the ball mill may be increased, thereby reducing the yield.

A processing speed of the ball mill may be in a range of about 100 rpm to 500 rpm. When the processing speed of the ball mill is greater than the predetermined range, for example, greater than about 500 rpm, a reaction vessel may be excessively heated. In contrast, when the processing speed of the ball mill is less than the predetermined range, for example, less than about 100 rpm, the ball mill effect may be reduced, thereby causing problems.

A processing time of the ball mill may be in a range of 30 minutes to 5 hours. In the case that the processing time of the ball mill is longer than the predetermined range, for example, greater than about 5 hours, a general yield may be reduced, and a general particle size may be reduced. In contrast, when the processing time of the ball mill is shorter than the predetermined range, for example, less than about 30 minutes, the ball mill effect may be reduced, thereby causing problems.

The activated carbon manufacturing method may further include cleaning the precursor by using an acid in order to remove impurities, after the equalizing through the ball mill process. Herein, the acid may include hydrochloric acid, nitric acid, or sulfuric acid, but the present invention is not limited thereto.

In addition, the activated carbon manufacturing method may further include selecting the equalized carbon precursor by using a sieve having a size that is in a range of about 100 um to 250 um, after the equalizing and the acid cleaning. As such, the activated carbon having uniform particle sizes and increased specific surface areas can be obtained, and impurities may be removed. The particle size uniformity of the activated carbon may be an important factor when the activated carbon is manufactured to apply it to an actual product. For example, when being used for a water purifier filter, an air-conditioning filter of a vehicle, a supercapacitor electrode, or the like, the activated carbon may be modified into a pellet or granular shape by mixing it with a binder. In this case, when the particle sizes are not uniform, the performance may be deteriorated. As described above, when the carbon precursor is selected by using the sieve having a size in a range of about 100 um to 250 um, the thus obtained activated carbon may be used in the vehicle air filter in air conditioning system.

The oxidizing agent used in the activating of the carbon precursor by adding an oxidizing agent and distilled water into the equalized carbon precursors and performing a heat treatment thereon (S40) may include $H_2O_2$, $HNO_3$, $O_3$, $N_2O$, $H_2SO_4$, $F_2$, $Cl_2$, another halogen-group oxidizing agent, or a combination thereof. $H_2O_2$ may be preferred, but the present invention is not limited thereto. As described above, the carbon precursor may be by simultaneously using the oxidizing agent and the distilled water (oxidizing agent-steam activation) to increase the activity of steam molecules. Accordingly, a formation rate of ultra-micropores having a diameter of 1 nm or less on carbon surfaces may be selectively increased. Accordingly, a specific surface area of the activated carbon and pore uniformity may be increased.

Typically, the conventional activated carbon has been formed to have about 50 to 70% of micropores with a diameter of about 2 nm and a large amount (for example, 30 to 50%) of mesopores with a diameter of about 2 to 50 nm. Accordingly, it may be difficult to form ultra-micropores of about 1 nm or less. However, as described above, greater number of ultra-micropores of about 1 nm or less through the oxidizing agent-steam activation may be formed.

Preferably, as supported in the following examples, ultra-micropores having a diameter of about 1.0 nm or less may be formed on a surface of the activated carbon through such activation. For example, sizes of the activated carbon may be in a range of about 0 to 1.0 nm, of about 0.3 nm to 1.0 nm, of about 0.3 nm to 0.6 nm, of about 0.6 nm or less, of about 0 nm to 0.6 nm, of about 0.75 or less, of about 0.3 nm to 0.75 nm, or of about 0 nm to 0.75 nm. In this case, a total pore volume of the activated carbon surface may be in a range of about 0.5 $cm^3/g$ to 0.7 $cm^3/g$, and a pore volume of the ultra-micropores thereof may be in a range of about 0.4 $cm^3/g$ to 0.5 $cm^3/g$. Further, a volume of the ultra-micropore may be in a range of about 67 volume % to 83 volume % for a total of 100 volume % of pores of the activated carbon surface. The specific surface area may be greatly improved by using a high pore volume ratio of the ultra-micropores having a high pore volume ratio. Particularly, a specific surface area of BET of the activated carbon may be greater than about 672.7 m$^2$/g. Preferably, the specific surface area may be in a range of greater than 672.7 m$^2$/g to 1185.1 m$^2$/g.

In the activating, a volume of the oxidizing agent may be in a range of about 10 volume % to 50 volume % for a total of 100 volume % of the oxidizing agent and distilled water. For example, the volume of the oxidizing agent may be in a range of about 5 volume % to 50 volume %, of about 5 volume % to 40 volume %, of about 5 volume % to 35 volume %, of about 5 volume % to 25 volume %, or of about 5 volume % to 15 volume %. As a ratio of the oxidizing agent is increased, a specific surface area may be increased by an introducing ratio of an oxygen functional group into precursor surfaces and micropore development. However, when the ratio of the oxidizing agent is greater than the predetermined range, for example greater than about 50 volume %, a ratio of the micropores may be reduced, thereby reducing the specific surface area and the yield.

The activating may be performed at a temperature that is in a range of about 700° C. to 1000° C. When the activating is performed at a temperature that is 1 than 700° C., an activating effect may be reduced. When the activating is performed at a temperature that is greater than about 1000° C., the yield may be sharply deteriorated.

The activating may be performed while injecting a mixture of an oxidizing agent and distilled water into a furnace, after the carbon precursor may be inserted into the furnace. In this case, the mixture of the oxidizing agent and the distilled water may be injected into the furnace, into which the carbon precursor has been inserted, at a speed that is in a range of about 1 ml/h to 100 ml/h, and an internal pressure of the furnace may be adjusted in a range of greater than 0 bar to about 5 bar.

The internal pressure of the furnace may be adjusted in a range of about 2 bar to 5 bar. When the internal pressure of the furnace is less than the predetermined range, for example, less than about 2 bar, the activating effect may be reduced. In contrast, when the internal pressure of the furnace is greater than the predetermined range, for example, greater than about 5 bar, breakage of micropores and development of pores that are greater in size than the mesopores may be significantly increased, thereby reducing the specific surface area. In addition, as the pressure is increased, a carbonization yield may be reduced.

The activating may be performed for a time that is in a range of about 1 hour to 5 hours. When an activating time is longer than the predetermined time, for example, greater than about 5 hours, the yield may be reduced, and a general structure of the pores of the material may be broken. In contrast, when the activating time is less than the predetermined time, for example, less than about 1 hour, an activating effect may be reduced.

According to an exemplary embodiment of the present invention, the manufacturing method of the activated carbon may further include reducing surfaces of the carbon precursor by heat treating thereon under an atmosphere including hydrogen (H$_2$). In the aforementioned oxidizing agent-steam activation, the carbon dioxide adsorptive capacity may be reduced by introduction of an acidic site (δ+) caused by the oxidizing agent. However, when using an additional reducing step of a surface functional group, a surface acidity may be decreased by minimizing a surface acid center, thereby improving a carbon dioxide adsorptive capacity of an adsorbent.

As supported by the following examples, through such a reducing step, ultra-micropores having a diameter of about 0.6 nm, which is less than about 1 nm in size, may be formed. Particularly, the ultra-micropores may be formed to have a diameter in a range of greater than 0 nm to about 0.6 nm. As described above, such ultra-micropores may have a high pore volume ratio, thereby contributing to improvement of the specific surface area of the activated carbon.

In addition, oxygen functional groups formed on the activated carbon surfaces may be removed through this reducing step in the oxidizing agent-steam heat treatment step, thereby further improving the carbon dioxide adsorptive capacity.

The reducing step may be performed under a mixing environment in which an inert gas and hydrogen (H$_2$) gas are mixed, and a volume of the hydrogen (H$_2$) gas may be in a range of greater than 0 volume % to about 10 volume % for a total of 100 volume % of the inert gas and hydrogen (H$_2$) gas. When the ratio of the hydrogen gas is greater than the predetermined amount, for example, greater than about 10 volume %, there may be a risk of explosion.

The reducing step may be performed at a temperature that is in a range of about 700° C. to 1000° C.

When the reducing temperature is less than the predetermined temperature, for example, less than about 700° C., a reducing effect may be decreased. In contrast, when the temperature is greater than the predetermined temperature, for example, greater than about 1000° C., a pore structure may be broken.

The reducing step may be performed for a time that is in a range of 5 hours to 10 hours. When the reducing time is less than about the predetermined range, for example, less than about 5 hours, the reducing effect may be decreased. In contrast, when the reducing time is greater than the predetermined range, for example, greater than about 10 hours, the pore structure may be broken.

The following examples illustrate the present invention in further detail. However, the following exemplary embodiments are for illustrative purposes only, and the scope of the present invention is not limited thereto.

EXAMPLE

Comparative Example 1

A sample was obtained by inserting vegetable-based carbon precursors (starch) into a tubal furnace, heating them to a temperature of 800° C. at a temperature-increasing rate of 2° C./min, and maintaining them for 90 minutes to carbonize them. Then, it was cooled to room temperature. Thereafter, the sample was cleaned one or two times by using a 1 M hydrochloric acid solution and distilled water, and then was completely dried at 120° C. for 12 hours.

The carbonized carbon precursors were then ground, sequentially cleaned by using a 1 M hydrochloric acid solution, and dried in a vacuum oven, to obtain activated carbon. In the ball mill grinding, zirconia balls having diameters of 5 mm and 10 mm were mixed (5 mm:10 mm=30 volume %:70 volume %) to be used, and the grinding was performed at 360 rpm for 1 hour. Further, a volume of the carbon precursors was set to 30 volume % for a total of 100 volume % of the balls used for the carbon precursors and ball mill.

Comparative Example 2

A sample was obtained by inserting vegetable-based carbon precursors (starch) into a tubal furnace, heating them to a temperature of 800° C. at a temperature-increasing rate of 2° C./min, and maintaining them for 90 minutes to carbonize them. Then, it was cooled to room temperature. Thereafter, the sample was cleaned one or two times by using a 1 M hydrochloric acid solution and distilled water, and then was completely dried at a temperature of 120° C. for 12 hours.

The carbonized carbon precursors were then ground, sequentially cleaned by using a 1 M hydrochloric acid solution, and dried in a vacuum oven. In the ball mill grinding, zirconia balls having diameters of 5 mm and 10 mm were mixed (5 mm:10 mm=30 volume %:70 volume %) to be used, and the grinding was performed at 360 rpm for 1 hour. Further, a volume of the carbon precursors was to set as 30 volume % for a total of 100 volume % of the balls used for the carbon precursors and ball mill.

Thereafter, carbonized starch was uniformly spread in an alumina boat and positioned in a tubal furnace.

Next, after the sample was heated to a temperature of 800° C. at a temperature-increasing rate of 2° C./min under a nitrogen ($N_2$) atmosphere, the supply of nitrogen ($N_2$) gas was stopped, and distilled water was injected at a speed of 6 ml/h to be activated while maintaining an internal pressure of the furnace for 1 hour.

Thereafter, the sample was cleaned one or two times by using a 1 M hydrochloric acid solution and distilled water, and then was completely dried at 120° C. for 12 hours, to obtain activated carbon.

Example 1

A sample was obtained by inserting vegetable-based carbon precursors (starch) inserted into a tubal furnace, heating them to a temperature of 800° C. at a temperature-increasing rate of 2° C./min under a nitrogen ($N_2$) gas atmosphere, and maintaining them for 90 minutes to carbonize them. Then, it was cooled to room temperature. Thereafter, the sample was cleaned one or two times by using a 1 M hydrochloric acid solution and distilled water, and then was completely dried at a temperature of 120° C. for 12 hours.

The carbonized carbon precursors were then ground, sequentially cleaned by using a 1 M hydrochloric acid solution, and dried in a vacuum oven. In the ball mill grinding, zirconia balls having diameters of 5 mm and 10 mm were mixed (5 mm:10 mm=30 volume %:70 volume %) to be used, and the grinding was performed at 360 rpm for 1 h. Further, a volume of the carbon precursors was to set as 30 volume % for a total of 100 volume % of the balls used for the carbon precursors and ball mill.

Then, the ground precursors were selected by using a 150 um sieve. Thereafter, carbonized starch was uniformly spread in an alumina boat and positioned in a tubal furnace.

Next, after the sample was heated to a temperature of 800° C. at a temperature-increasing rate of 2° C./min under a nitrogen ($N_2$) atmosphere, the supply of nitrogen $N_2$ gas was stopped, and a material obtained by mixing hydrogen peroxide (oxidizing agent) and distilled water at a volume ratio (10:90 of oxidizing agent:distilled water) was injected at a speed of 6 ml/h to be activated while maintaining an internal pressure of the furnace for 1 hour.

Thereafter, the sample was cleaned one or two times by using a 1 M hydrochloric acid solution and distilled water, and then was completely dried at a temperature of 120° C. for 12 hours, to obtain activated carbon.

Example 2

The activated carbon obtained in Example 1 was inserted into a tubal furnace, and heated to a temperature of 800° C. at a temperature-increasing rate of 2° C./min under a mixing environment in which argon (Ar) and hydrogen ($H_2$) gas were mixed at a predetermined volume ratio (90:10, Ar:$H_2$) to be maintained for 5 hours. Then, it was cooled to room temperature. Thereafter, it was cleaned two or three times by using ethanol and distilled water, and then was completely dried at 120° C. for 12 hours, to obtain activated carbon.

Experimental Example 1

77K/nitrogen adsorption experiment was performed by using BELSORP MAX equipment made in Japan by BELSORP company. This result is shown in FIG. 2 and Table 1.

A deriving operation of data in Table 1 is as follows. A specific surface area was derived by using a Brunauer-Emmett-Teller (BET) formula. A total pore volume was calculated by using an adsorptive curve up to a relative pressure of 0.990, a micropore volume was derived by using a Dubinin-Radushkevich (D-R) formula, and a volume of mesopores was calculated by subtracting a volume of micropores from the total pore volume.

Figure 2:
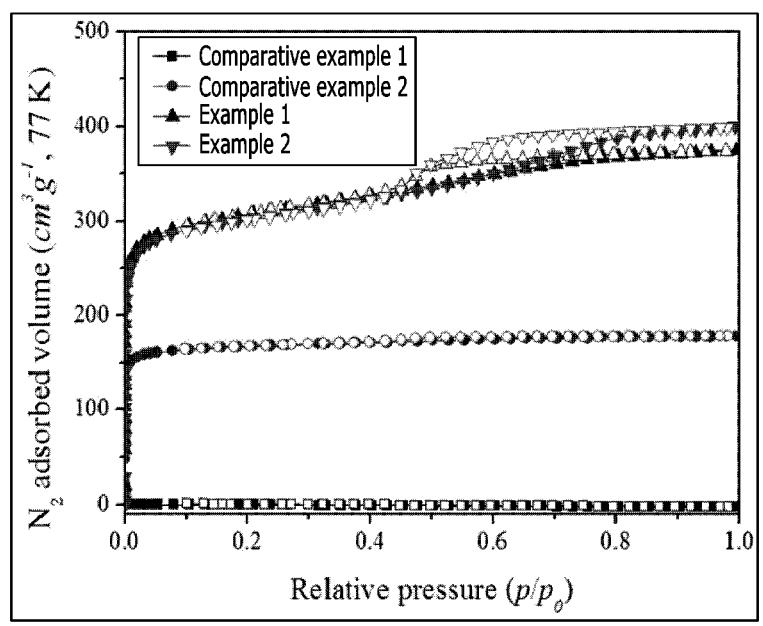
FIG. 2 shows experimental results of a nitrogen adsorption experiment according to examples and comparative examples of the present invention.

As shown in FIG. 2 and Table 1, formation of the micropores was further improved in the activated carbon of Example 1 performing oxidizing agent-steam activation using an oxidizing agent and distilled water than in Comparative Example 2 using distilled water. Further, formation of the micropores was further improved in activated carbon of Example 2 additionally including reduction after the activation compared to Comparative Example 2. In addition, the specific surface area was superbly improved in Examples 1 and 2.

TABLE 1

| Classification | BET specific surface area ($m^2g^{-1}$) | Total pore volume ($cm^3g^{-1}$) | Micropore volume ($cm^3g^{-1}$) | Mesopore volume ($cm^3g^{-1}$) | Micropore volume ratio (%) |
|---|---|---|---|---|---|
| Comparative Example 1 | — | — | — | — | — |
| Comparative Example 2 | 672.7 | 0.2763 | 0.2545 | 0.0218 | 92.0 |
| Example 1 | 1185.1 | 0.5797 | 0.4521 | 0.1276 | 77.9 |
| Example 2 | 1161.2 | 0.6184 | 0.4485 | 0.1699 | 72.5 |

Experimental Example 2

Figure 3:
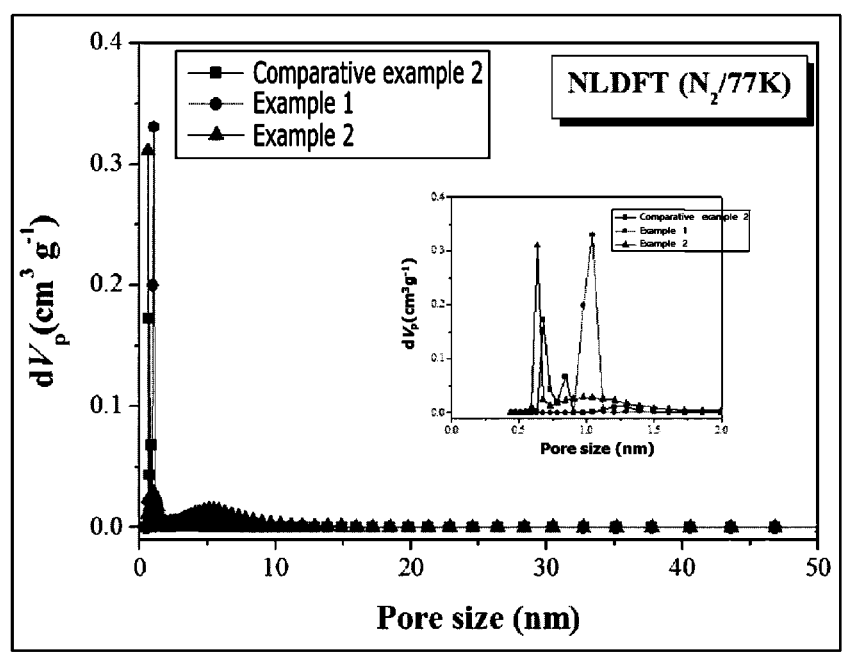
FIG. 3 shows calculation results of a pore distribution map for an exemplary activated carbon according to examples and a comparative example of the present disclosure.

A Non-Local Density Functional Theory (NLDFT) model was used by employing a nitrogen-adsorbing curve obtained in FIG. 2 to calculate a pore distribution map depending on the pore diameter. A calculating condition thereof is as follows. Results of $N_2$/77K adsorption-desorption isotherm and slit model are shown in FIG. 3.

It is impossible to perform the analysis since pores are hardly formed in Comparative Example 1 using milling. As shown in FIG. 3, less micropores were non-uniformly formed in Comparative Example 1 using the steam activation. In Example 1 using the oxidizing agent-steam activation, a large number of ultra-micropores of about 1 nm to have more uniform distribution than in Comparative Example 2 using the steam activation were formed. In Example 2 adding reduction into Example 1, the ultra-micropores having a diameter of about 1 nm were more finely formed to about 0.6 nm to have the most uniform distribution.

Experimental Example 3

Figure 4:
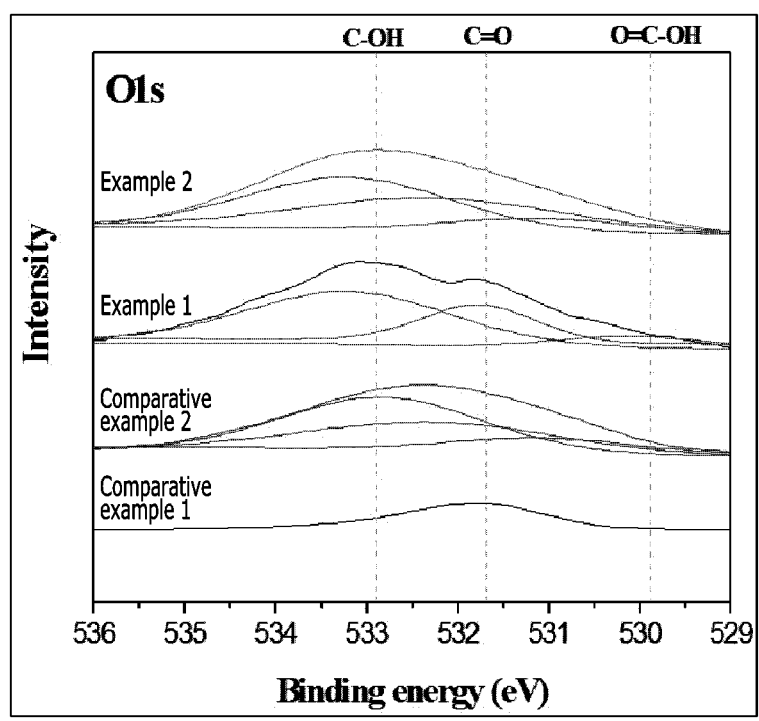
FIG. 4 shows experimental measurement results of O1s peaks for an exemplary activated carbon according to examples and comparative examples of the present disclosure.

FIG. 4 illustrates result data of observing surface O1s peaks using XPS. Surface functional groups were analyzed by employing a K-Alpha model made by Thermo Fisher Scientific company and Mgka x-rays of 150 W.

A carbonyl C=0 peak which existed on the surface of Comparative Example 1 from milling was observed. In Comparative Example 2 using the steam activation, some hydroxyl group (C—OH) peaks were observed. This may be because of an effect of water molecules ($H_2O$) in the steam activation.

In Example 1 using the oxidizing agent-steam activation, carbonyl C=O peaks and carboxyl group (—COOH) peaks were increased as compared with conventional steam activation. This may be as a result of surface oxidation depending on addition of the oxidizing agent.

In Example 2 adding reduction into Example 1, carbonyl C=O peaks and carboxyl group (—COOH) peaks were reduced to show a similar surface state to Comparative Example 2. Accordingly, it is seen that oxygen functional groups of the activated carbon surface may be reduced through the reduction.

Experimental Example 4

Figure 5:
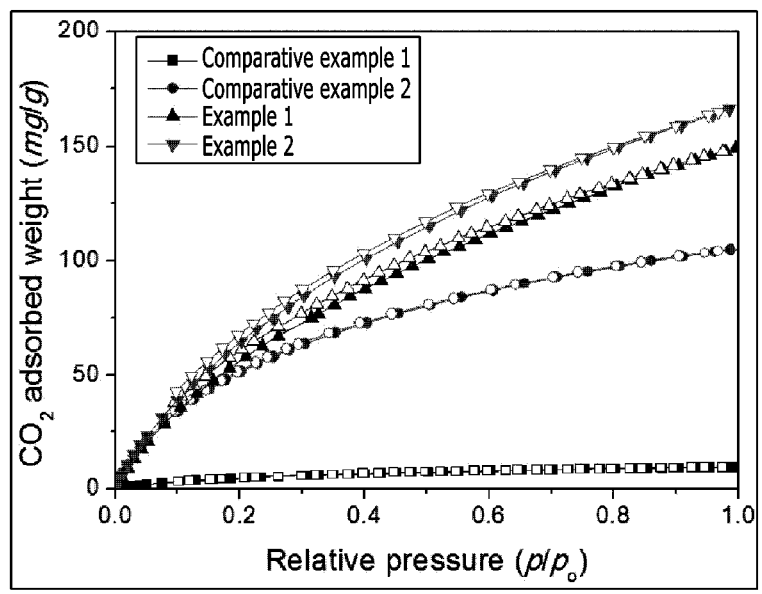
FIG. 5 shows experimental measurement results of adsorbing efficiency of carbon dioxide onto an exemplary activated carbon according to examples and comparative examples of the present invention.

298K/carbon dioxide adsorbing experiment was performed by using BELSORP MAX equipment made in Japan by BELSORP company. This result is shown in FIG. 5. A solution obtained by mixing ethylene glycol and water at a ratio of 3:7 was inserted into a constant temperature oven to be maintained at a temperature of 298 K, in order to maintain a room temperature state.

As shown in FIG. 5, in Comparative Example 1, a carbon dioxide adsorbing effect was hardly obtained. Further, it is seen that the carbon dioxide adsorbing effect of the activated carbon may be improved in Example 1 and Example 2 using the oxidizing agent-steam activation or additional reduction as compared with Comparative Example 2 using the steam activation. Particularly, the carbon dioxide adsorbing effect was further improved by reduction of the surface acid group in Example 2 using the additional reduction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing an activated carbon, the method comprising:
preparing a carbon precursor;
carbonizing the carbon precursor by heat treating thereon;
equalizing the carbon precursor carbonized by grinding them; and
activating the equalized carbon precursor by adding an oxidizing agent and distilled water into the equalized carbon precursor and heat treating thereon, to form the activated carbon,
wherein a volume of the oxidizing agent is in a range of about 10 volume % to 50 volume % for a total of 100 volume % of the oxidizing agent and the distilled water, in the activating,
wherein the oxidizing agent includes $H_2O_2$, and wherein the activating is performed at a temperature in a range of about 700° C. to 1000° C.

2. The method of claim 1, wherein the activating is performed while injecting a mixture of the oxidizing agent and the distilled water into the carbon precursor at a speed of about 1 ml/h to 100 ml/h.

3. The method of claim 2, wherein the activating is performed under a pressure that is in a range of 0 bar to about 5 bar.

4. The method of claim 1, wherein the activating is performed for a time that is in a range of about 1 h to 5 h.

5. The method of claim 1, further comprising
reducing a surface of the activated carbon by heat treating thereon under an atmosphere including hydrogen ($H_2$).

6. The method of claim 5, wherein the reducing is performed under a mixing environment in which an inert gas and hydrogen ($H_2$) gas are mixed, and
a volume of the hydrogen ($H_2$) gas is in a range of greater than 0 volume % to about 10 volume % for a total of 100 volume % of the inert gas and hydrogen ($H_2$) gas.

7. The method of claim 5, wherein the reducing is performed at a temperature in a range of about 700° C. to 1000° C.

8. The method of claim 5, wherein the reducing is performed for about 5 h to 10 h.

9. The method of claim 1, further comprising
selecting the equalized carbon precursor by using a sieve having a size in a range of about 100 um to 250 um, after the equalizing.

10. The method of claim 1, wherein the equalizing is performed by using a ball mill, and
a particle size of a ball used for the ball mill is in a range of about 1 mm to 20 mm.

11. The method of claim 10, wherein a volume of the carbon precursor is in a range of about 0.1 volume % to 40 volume % for a total of 100 volume % of the carbon precursor and the ball mill, in the equalizing.

12. The method of claim 10, wherein a processing speed for the ball mill is in a range of about 100 rpm to 500 rpm, in the equalizing.

13. The method of claim 10, wherein a processing time for the ball mill is in a range of 30 minutes to 5 hours, in the equalizing.

14. The method of claim 1, wherein the carbonizing is performed at a temperature that is in a range of about 700° C. to 1000° C.

15. The method of claim 1, wherein the carbon precursor includes starch, coconut husks, citrus peel, coffee grounds, bamboo stems, or a combination thereof.

* * * * *